United States Patent
Jöngren et al.

(10) Patent No.: US 9,300,450 B2
(45) Date of Patent: Mar. 29, 2016

(54) DISTRIBUTION OF CELL-COMMON DOWNLINK SIGNALS IN A HIERARCHICAL HETEROGENEOUS CELL DEPLOYMENT

(75) Inventors: George Jöngren, Stockholm (SE); Lars Lindbom, Karlstad (SE); Stefan Parkvall, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 226 days.

(21) Appl. No.: 13/389,501

(22) PCT Filed: Nov. 2, 2011

(86) PCT No.: PCT/SE2011/051307
§ 371 (c)(1),
(2), (4) Date: Feb. 8, 2012

(87) PCT Pub. No.: WO2012/108806
PCT Pub. Date: Aug. 16, 2012

(65) Prior Publication Data
US 2012/0201164 A1    Aug. 9, 2012

Related U.S. Application Data

(60) Provisional application No. 61/440,916, filed on Feb. 9, 2011.

(51) Int. Cl.
*H04W 4/00* (2009.01)
*H04L 5/00* (2006.01)
(Continued)

(52) U.S. Cl.
CPC ............. *H04L 5/0048* (2013.01); *H04L 1/1812* (2013.01); *H04L 25/03898* (2013.01); *H04L 27/2613* (2013.01); *H04W 88/06* (2013.01)

(58) Field of Classification Search
None
See application file for complete search history.

(56) References Cited

U.S. PATENT DOCUMENTS

| 2010/0173637 A1 | 7/2010 | Damnjanovic et al. |
| 2010/0173660 A1* | 7/2010 | Liu et al. ............ 455/501 |

(Continued)

FOREIGN PATENT DOCUMENTS

WO    2010091425 A2    8/2010

OTHER PUBLICATIONS

3rd Generation Partnership Project. "Impact from CRS Interference on Performance." 3GPP TSG-RAN WG1 #62bis, R1-105591, Xi'an, China, Oct. 11-15, 2010.

(Continued)

*Primary Examiner* — Anh-Vu Ly
(74) *Attorney, Agent, or Firm* — Murphy, Bilak & Homiller, PLLC

(57) ABSTRACT

A high-power point (110) and one or more low-power points (120) transmit signals that are associated with the same cell-identifier in a heterogeneous cell deployment. The coverage areas corresponding to the low-power points (120) fall at least partly within the coverage area for the high-power point (110), so that mobile stations (130) within range of a low-power point are also within range of the high-power point (110), from a downlink perspective. The same CRS signals are transmitted by both the high-power (macro) point (110) and some or all of the low-power (pico) points (120). At the same time, the network transmits CRS-based PDSCH for a particular UE on both the high-power point (110) as well as on some or all of the low-power points (120). In some embodiments only a subset of the points, e.g., those points that the UE hears sufficiently well, participate in the PDSCH transmission using CRS for channel estimation.

13 Claims, 8 Drawing Sheets

(51) Int. Cl.
*H04L 1/18* (2006.01)
*H04L 25/03* (2006.01)
*H04L 27/26* (2006.01)
*H04W 88/06* (2009.01)

(56) References Cited

U.S. PATENT DOCUMENTS

| | | | |
|---|---|---|---|
| 2010/0240365 A1* | 9/2010 | Chen | 455/434 |
| 2010/0279686 A1* | 11/2010 | Tokgoz et al. | 455/435.1 |
| 2010/0323684 A1* | 12/2010 | Cai et al. | 455/422.1 |
| 2011/0038271 A1* | 2/2011 | Shin et al. | 370/252 |
| 2011/0092151 A1* | 4/2011 | Brisebois et al. | 455/1 |
| 2011/0143672 A1 | 6/2011 | Yoo et al. | |
| 2011/0194527 A1* | 8/2011 | Lin et al. | 370/330 |
| 2011/0222501 A1* | 9/2011 | Kim et al. | 370/329 |
| 2011/0237239 A1* | 9/2011 | Chou et al. | 455/422.1 |
| 2011/0299446 A1* | 12/2011 | Chun et al. | 370/311 |
| 2011/0305161 A1* | 12/2011 | Ekpenyong et al. | 370/252 |
| 2012/0076025 A1* | 3/2012 | Barbieri et al. | 370/252 |
| 2012/0082052 A1* | 4/2012 | Oteri et al. | 370/252 |
| 2012/0087261 A1* | 4/2012 | Yoo et al. | 370/252 |
| 2012/0106501 A1* | 5/2012 | Kishiyama et al. | 370/330 |
| 2012/0108239 A1* | 5/2012 | Damnjanovic et al. | 455/436 |
| 2012/0113961 A1* | 5/2012 | Krishnamurthy | 370/332 |
| 2012/0122472 A1* | 5/2012 | Krishnamurthy et al. | 455/456.1 |
| 2012/0155362 A1* | 6/2012 | Montojo | H04W 72/082 370/312 |
| 2012/0163335 A1* | 6/2012 | Chung et al. | 370/330 |
| 2012/0236741 A1* | 9/2012 | Xu et al. | 370/252 |
| 2012/0238268 A1* | 9/2012 | Radulescu et al. | 455/435.1 |
| 2012/0300694 A1* | 11/2012 | Watanabe | 370/315 |
| 2012/0329382 A1* | 12/2012 | Brisebois et al. | 455/1 |
| 2013/0044665 A1* | 2/2013 | Ng et al. | 370/311 |
| 2013/0064172 A1* | 3/2013 | Park et al. | 370/315 |

OTHER PUBLICATIONS

3rd Generation Partnership Project. "Considerations on Scenarios and Simulation Assumptions of CoMP." 3GPP TSG RAN WG1 Meeting #63bis, R1-110059, Dublin, Ireland, Jan. 17-21, 2011.

3rd Generation Partnership Project. "Discussion on Further Details of Scenario 4." 3GPP TSG RAN WG1 Meeting #64, R1-111000, Taipei, Taiwan, Feb. 21-25, 2011.

Dahlman, Erik et al. 4G LTE/LTE-Advanced for Mobile Broadband. 2011. pp. 152-154 and 301-304. Academic Press, Oxford, UK.

\* cited by examiner

DISTRIBUTION OF CELL-COMMON DOWNLINK SIGNALS IN A HIERARCHICAL HETEROGENEOUS CELL DEPLOYMENT

RELATED APPLICATION

This application claims priority to U.S. Provisional Application Ser. No. 61/440,916, filed 9 Feb. 2011, the entire contents of which are incorporated by reference herein.

TECHNICAL FIELD

The present invention relates generally to the control of devices in wireless communication networks, and more particularly relates to techniques for allocating reference signals to carrier resources in these networks.

BACKGROUND

The 3rd-Generation Partnership Project (3GPP) is continuing development of the fourth-generation wireless network technologies known as Long-Term Evolution (LTE). Improved support for heterogeneous network operations is part of the ongoing specification of 3GPP LTE Release-10, and further improvements are being discussed in the context of new features for Release-11. In heterogeneous networks, a mixture of cells of different sizes and overlapping coverage areas are deployed.

One example of such a deployment is seen in the system 100 illustrated in FIG. 1, where several pico-cells 120, each with a respective coverage area 150, are deployed within the larger coverage area 140 of a macro-cell 110. The system 100 of FIG. 1 is suggestive of a wide-area wireless network deployment. However, other examples of low power nodes, also referred to as "points," in heterogeneous networks are home base stations and relays.

Throughout this document, nodes or points in a network are often referred to as being of a certain type, e.g., a "macro" node, or a "pico" point. However, unless explicitly stated otherwise, this should not be interpreted as an absolute quantification of the role of the node or point in the network but rather as a convenient way of discussing the roles of different nodes or points relative to one another. Thus, a discussion about macro- and pico-cells could just as well be applicable to the interaction between micro-cells and femto-cells, for example.

One aim of deploying low-power nodes such as pico base stations within the macro coverage area is to improve system capacity, by means of cell-splitting gains. In addition to improving overall system capacity, this approach also allows users to be provided with a wide-area experience of very-high-speed data access, throughout the network. Heterogeneous deployments are in particular effective to cover traffic hotspots, i.e., small geographical areas with high user densities. These areas can be served by pico cells, for example, as an alternative deployment to a denser macro network.

The most basic means to operate heterogeneous networks is to apply frequency separation between the different layers. For instance, the macro-cell 110 and pico-cells 120 pictured in FIG. 1 can be configured to operate on different, non-overlapping carrier frequencies, thus avoiding any interference between the layers. With no macro-cell interference towards the under-laid cells, cell-splitting gains are achieved when all resources can simultaneously be used by the under-laid cells.

One drawback of operating layers on different carrier frequencies is that it may lead to inefficiencies in resource utilization. For example, if there is a low level of activity in the pico-cells, it could be more efficient to use all carrier frequencies in the macro-cell, and then basically switch off the pico-cells. However, the split of carrier frequencies across layers in this basic configuration is typically done in a static manner.

Another approach to operating a heterogeneous network is to share radio resources between layers. Thus, two (or more) layers can use the same carrier frequencies, by coordinating transmissions across macro- and under-laid cells. This type of coordination is referred to as inter-cell interference coordination (ICIC). With this approach, certain radio resources are allocated to the macro cells for a given time period, whereas the remaining resources can be accessed by the under-laid cells without interference from the macro cell. Depending on the traffic situations across the layers, this resource split can change over time to accommodate different traffic demands. In contrast to the earlier described static allocation of carrier frequencies, this way of sharing radio resources across layers can be made more or less dynamic depending on the implementation of the interface between the nodes. In LTE, for example, an X2 interface has been specified in order to exchange different types of information between base station nodes, for coordination of resources. One example of such information exchange is that a base station can inform other base stations that it will reduce transmit power on certain resources.

Time synchronization between base station nodes is generally required to ensure that ICIC across layers will work efficiently in heterogeneous networks. This is of particular importance for time-domain-based ICIC schemes, where resources are shared in time on the same carrier.

Orthogonal Frequency-Division Multiplexing (OFDM) technology is a key underlying component of LTE. As is well known to those skilled in the art, OFDM is a digital multi-carrier modulation scheme employing a large number of closely-spaced orthogonal sub-carriers. Each sub-carrier is separately modulated using conventional modulation techniques and channel coding schemes. In particular, 3GPP has specified Orthogonal Frequency Division Multiple Access (OFDMA) for the downlink transmissions from the base station to a mobile terminal, and single carrier frequency division multiple access (SC-FDMA) for uplink transmissions from a mobile terminal to a base station. Both multiple access schemes permit the available sub-carriers to be allocated among several users.

SC-FDMA technology employs specially formed OFDM signals, and is therefore often called "pre-coded OFDM" or Discrete-Fourier-Transform (DFT)-spread OFDM. Although similar in many respects to conventional OFDMA technology, SC-FDMA signals offer a reduced peak-to-average power ratio (PAPR) compared to OFDMA signals, thus allowing transmitter power amplifiers to be operated more efficiently. This in turn facilitates more efficient usage of a mobile terminal's limited battery resources. (SC-FDMA is described more fully in Myung, et al, "Single Carrier FDMA for Uplink Wireless Transmission," *IEEE Vehicular Technology Magazine*, vol. 1, no. 3, September 2006, pp. 30-38.)

The basic LTE physical resource can be seen as a time-frequency grid. This concept is illustrated in FIG. 2, which shows a number of so-called subcarriers in the frequency domain, at a frequency spacing of Δf, divided into OFDM symbol intervals in the time domain. Each individual element of the resource grid 210 is called a resource element 220, and corresponds to one subcarrier during one OFDM symbol interval, on a given antenna port. One aspect of OFDM is that each symbol 230 begins with a cyclic prefix 240, which is essentially a reproduction of the last portion of the symbol 230 affixed to the beginning. This feature minimizes problems from multipath, over a wide range of radio signal environments.

In the time domain, LTE downlink transmissions are organized into radio frames of ten milliseconds each, each radio frame consisting of ten equally-sized subframes of one millisecond duration. This is illustrated in FIG. 3, where an LTE signal 310 includes several frames 320, each of which is divided into ten subframes 330. Not shown in FIG. 3 is that each subframe 330 is further divided into two slots, each of which is 0.5 milliseconds in duration.

LTE link resources are organized into "resource blocks," defined as time-frequency blocks with a duration of 0.5 milliseconds, corresponding to one slot, and encompassing a bandwidth of 180 kHz, corresponding to 12 contiguous sub-carriers with a spacing of 15 kHz. Resource blocks are numbered in the frequency domain, starting with 0 from one end of the system bandwidth. Two time-consecutive resource blocks represent a resource block pair, and correspond to the time interval upon which scheduling operates. Of course, the exact definition of a resource block may vary between LTE and similar systems, and the inventive methods and apparatus described herein are not limited to the numbers used herein.

In general, however, resource blocks may be dynamically assigned to mobile terminals, and may be assigned independently for the uplink and the downlink. Depending on a mobile terminal's data throughput needs, the system resources allocated to it may be increased by allocating resource blocks across several sub-frames, or across several frequency blocks, or both. Thus, the instantaneous bandwidth allocated to a mobile terminal in a scheduling process may be dynamically adapted to respond to changing conditions.

For scheduling of downlink data, the base station transmits control information in each subframe. This control information identifies the mobile terminals to which data is targeted and the resource blocks, in the current downlink subframe, that are carrying the data for each terminal. The first one, two, three, or four OFDM symbols in each subframe are used to carry this control signaling. In FIG. 4, a downlink subframe 410 is shown, with three OFDM symbols allocated to control region 420. The control region 420 consists primarily of control data elements 434, but also includes a number of reference symbols 432, used by the receiving station to measure channel conditions. These reference symbols 432 are interspersed at pre-determined locations throughout the control region 420 and among the data symbols 436 in the data portion 430 of the subframe 410.

Transmissions in LTE are dynamically scheduled in each subframe, where the base station transmits downlink assignments/uplink grants to certain mobile terminals (user equipment, or UEs, in 3GPP terminology) via the physical downlink control channel (PDCCH). The PDCCHs are transmitted in the control region of the OFDM signal, i.e., in the first OFDM symbol(s) of each subframe, and span all or almost all of the entire system bandwidth. A UE that has decoded a downlink assignment, carried by a PDCCH, knows which resource elements in the subframe that contain data aimed for that particular UE. Similarly, upon receiving an uplink grant, the UE knows which time-frequency resources it should transmit upon. In the LTE downlink, data is carried by the physical downlink shared channel (PDSCH) and in the uplink the corresponding channel is referred to as the physical uplink shared channel (PUSCH).

LTE also employs multiple modulation formats, including at least QPSK, 16-QAM, and 64-QAM, as well as advanced coding techniques, so that data throughput may be optimized for any of a variety of signal conditions. Depending on the signal conditions and the desired data rate, a suitable combination of modulation format, coding scheme, and bandwidth is chosen, generally to maximize the system throughput. Power control is also employed to ensure acceptable bit error rates while minimizing interference between cells. In addition, LTE uses a hybrid-ARQ (HARQ) error correction protocol where, after receiving downlink data in a subframe, the terminal attempts to decode it and reports to the base station whether the decoding was successful (ACK) or not (NACK). In the event of an unsuccessful decoding attempt, the base station can retransmit the erroneous data.

SUMMARY

In so-called heterogeneous cell deployments, one or more relatively low power transmission points are deployed within the coverage area of a higher power transmission point. A UE that is capable of receiving and processing UE-specific reference symbols can receive shared data transmissions simultaneously from one or more low power transmission points and the high power transmission points, using the UE-specific reference symbols to characterize the transmission channel, and can thus enjoy improved signal reliability and/or higher data rates. However, UEs that are not configured to process UE-specific reference symbols, and that instead depend on cell-specific references symbols (CRS) for signal demodulation, do not directly benefit from this approach. Accordingly, techniques are needed for supporting UEs without UE-specific reference symbol capabilities in heterogenous cell deployments. More generally, improved techniques are needed for handling cell-common signals, such as CRS and synch channels, in a heterogeneous deployment of transmission points.

In several embodiments of the present invention, the same cell-common signals transmitted from the high-power (macro) point in a heterogeneous deployment, such as CRS and synch channels, are also distributed over at least some of the low-power (pico) points having coverage areas falling within the coverage area of the high-power point. In some embodiments, the set of low-power points involved in this distribution may be adapted by the network, based on channel properties of the UEs served by the cell. Similarly, the points participating in transmissions of data, e.g., via a Physical Downlink Shared Channel (PDSCH) and/or a Physical Downlink Control Channel (PDCCH) for a particular UE may be the same or different from the set of points used for the CRS distribution, depending on traffic pattern, UE capabilities, and the properties of the channels for the UE of interest. These techniques permit UEs that rely on CRS for signal demodulation to enjoy improved signal-to-interference-plus-noise (SINR) performance when in the vicinity of a low-power point, while maintaining the ability of UEs that support UE-specific reference symbols to enjoy higher data rates.

More particularly, in some embodiments, a high-power point and one or more low-power points transmit signals, which may be associated to the same cell-id, in a heterogeneous deployment. The coverage areas corresponding to these low-power points fall within or substantially within the coverage area for the high-power point, so that mobile stations within range of a low-power point are also within range of the high-power point, from a downlink perspective.

The same CRS signals are transmitted by both the high-power (macro) point and some or all of the low-power (pico) points. At the same time, the network transmits a physical downlink data channel for a particular UE on both the high-power point as well as on some or all of the low-power points. In some embodiments, and/or under some circumstances, all of the low-power points participate in the transmission of the physical downlink data channel to a particular UE that uses CRS for signal demodulation, while in other embodiments, and/or under some circumstances, only a subset of the points, e.g., those points that the UE hears sufficiently well, participate in the data transmission to that UE.

In some embodiments, the network monitors the traffic load of the different points and the channel properties from the points to the various UEs. Based on this monitoring, the network can selectively power down CRS transmission for points that do not handle a sufficiently large amount of traffic. In some embodiments this power down/up of CRS is made smooth, i.e., gradual, over a period including several CRS symbol transmissions, such that the changes in CRS power have a similar rate of time-variations as the time-variations induced by the channel fading. This approach can help avoid ruining the channel interpolation mechanism on the UE side.

In an example method, such as might be implemented in a network that includes a primary transmitting node, having a first coverage area, and one or more secondary transmitting nodes, each having a corresponding coverage area that falls within the first coverage area, CRS signals are transmitted from the primary transmitting node. The same CRS signals are also transmitted from the secondary nodes. A physical downlink shared channel (PDSCH) is transmitted from the primary transmitting node as well as from at least one of the secondary transmitting nodes.

In some cases, of course, there may be more than one secondary transmitting node in the first coverage area. The same CRS signals are transmitted from all of the two or more secondary transmitting nodes, in some cases. In some of these cases, the downlink shared channel is also transmitted to one or more UEs from all of the two or more secondary transmitting nodes, while in others it is transmitted from only a subset of the secondary nodes.

In some cases where there are two or more secondary transmitting nodes in the first coverage area, traffic load at each of the secondary transmitting nodes is monitored and transmissions of the CRS signal at each secondary transmitting node are selectively powered on and/or off, based on the corresponding traffic load. This is done, in some instances, by measuring uplink signals from a plurality of mobile stations in the first coverage area. In some cases, the power levels of the transmissions are ramped up and/or ramped down, as appropriate, over a time interval spanning several CRS symbol transmissions, which is selected so that the change in CRS power level is slower than channel variations due to fading.

In some embodiments, the particular subset of secondary nodes used for transmitting the physical shared downlink channel is determined based on whether data transmissions from each secondary transmitting node could be received by the mobile station with adequate signal strength. This is done, in some instances, by measuring uplink transmissions from the mobile station at one or more of the secondary transmitting nodes, or by monitoring channel-state-information feedback from the mobile station, or both.

Apparatus for carrying out the various processes disclosed herein are also described, including a system of transmitting nodes in a wireless network as well as a corresponding control unit. Of course, the present invention is not limited to the features and advantages summarized above. Indeed, those skilled in the art will recognize additional features and advantages of the present invention upon reading the following detailed description and viewing the attached drawings.

DETAILED DESCRIPTION

Figure 1:
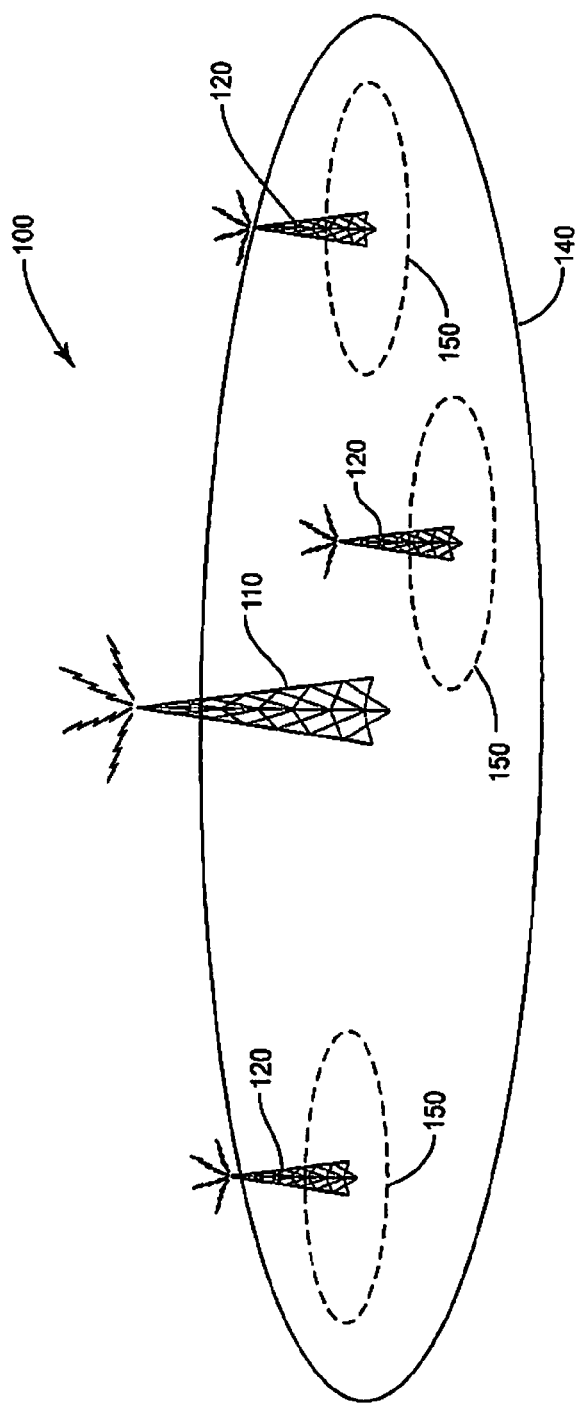
FIG. 1 illustrates several pica-cells overlaid by a macro-cell.
Figure 2:
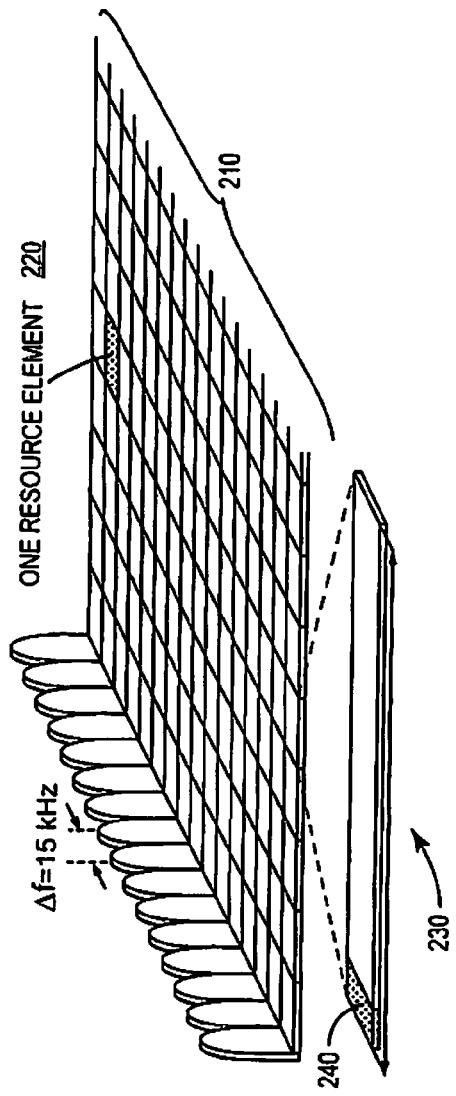
FIG. 2 illustrates features of the OFDM time-frequency resource grid.
Figure 3:
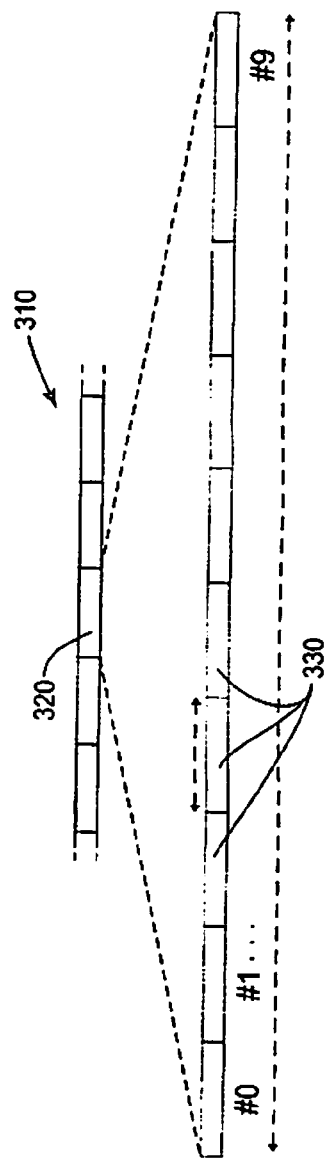
FIG. 3 illustrates the time-domain structure of an LTE signal.

Various embodiments of the present invention are now described with reference to the drawings, where like reference numerals are used to refer to like elements throughout. In the following description, numerous specific details are set forth for purposes of explanation, in order to provide a thorough understanding of one or more embodiments. It will be evident to one of ordinary skill in the art, however, that some embodiments of the present invention may be implemented or practiced without one or more of these specific details. In other instances, well-known structures and devices are shown in block diagram form in order to facilitate describing embodiments.

Note that although terminology from 3GPP's specifications for LTE and LTE-Advanced is used throughout this document to exemplify the invention, this should not be seen as limiting the scope of the invention to only these systems. Other wireless systems including or adapted to include heterogeneous cell deployments may also benefit from exploiting the ideas covered herein.

Demodulation of transmitted data generally requires estimation of the radio channel. In LTE systems, this is done using transmitted reference symbols (RS), i.e., transmitted symbols having values that are already known to the receiver. In LTE, cell-specific reference symbols (CRS) are transmitted in all downlink subframes. In addition to assisting downlink channel estimation, the CRS are also used for mobility measurements performed by the UEs.

The CRS are generally intended for use by all the mobile terminals in the coverage area. To support improved channel estimation, especially when multiple-input multiple-output (MIMO) transmission techniques are used, LTE also supports UE-specific reference symbols, which are targeted to individual mobile terminals and are intended specifically for channel estimation for demodulation purposes.

Figure 4:
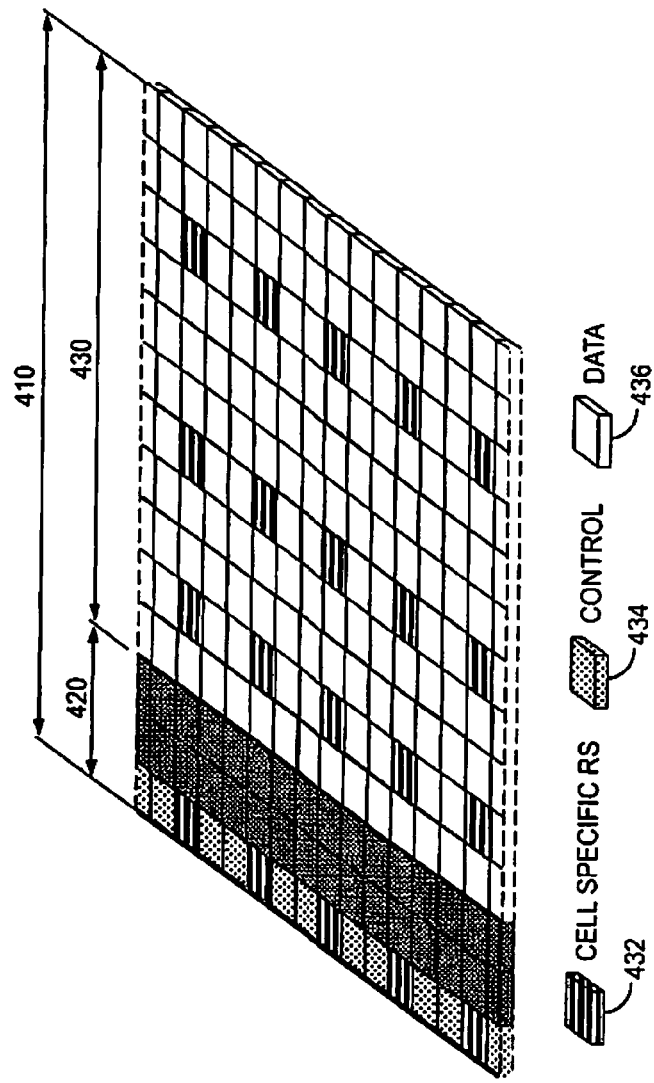
FIG. 4 illustrates features of an LTE downlink subframe.

FIG. 4 illustrates how the mapping of physical control/data channels and signals can be done on resource elements within a downlink subframe 410. In the pictured example, the PDCCHs occupy only the first out of the three possible OFDM symbols that make up the control region 420, so in this particular case the mapping of data can begin at the second OFDM symbol. Since the CRS are common to all UEs in the cell, the transmission of CRS cannot be easily adapted to suit the needs of a particular UE. This is in contrast to UE-specific reference symbols, by means of which each UE can have reference symbols of its own placed in the data region 430 of FIG. 4, as part of PDSCH.

The length (one, two, or three symbols) of the control region that is used to carry PDCCH can vary on a subframe-to-subframe basis, and is signaled to the UE in the Physical Control Format Indicator CHannel (PCFICH). The PCFICH is transmitted within the control region, at locations known by terminals. Once a terminal has decoded the PCFICH, it then knows the size of the control region and in which OFDM symbol the data transmission starts.

Also transmitted in the control region is the Physical Hybrid-ARQ Indicator Channel. This channel carries ACK/NACK responses to a terminal, to inform the mobile terminal whether the uplink data transmission in a previous subframe was successfully decoded by the base station.

As noted above, CRS are not the only reference symbols available in LTE. As of LTE Release-10, a new reference symbol concept was introduced. Separate UE-specific reference symbols for demodulation of PDSCH are supported in Release 10, as are reference symbols specifically provided for measuring the channel for the purpose of generating channel state information (CSI) feedback from the UE. The latter reference symbols are referred to as CSI-RS. CSI-RS are not transmitted in every subframe, and they are generally sparser in time and frequency than reference symbols used for demodulation. CSI-RS transmissions may take place every fifth, tenth, twentieth, fortieth, or eightieth subframe, as determined by a periodicity parameter and a subframe offset, each of which are configured by Radio Resource Control (RRC) signaling.

A UE operating in connected mode can be requested by the base station to perform channel state information (CSI) reporting. This reporting can include, for example, reporting a suitable rank indicator (RI) and one or more precoding matrix indices (PMIs), given the observed channel conditions, as well as a channel quality indicator (CQI). Other types of CSI are also conceivable, including explicit channel feedback and interference covariance feedback. The CSI feedback assists the base station in scheduling, including deciding which subframe and resource blocks to use for the transmission, as well as deciding which transmission scheme and/or precoder should be used. The CSI feedback also provides information that can be used to determine a proper user bit-rate for the transmission, i.e., for link adaptation.

In LTE, both periodic and aperiodic CSI reporting are supported. In the case of periodic CSI reporting, the terminal reports the CSI measurements on a configured periodic time basis, using the physical uplink control channel (PUCCH). With aperiodic reporting, the CSI feedback is transmitted on the physical uplink shared channel (PUSCH) at pre-specified time instants after receiving the CSI grant from the base station. With aperiodic CSI reports, the base station can thus request CSI that reflects downlink radio conditions in a particular subframe.

Figure 5:
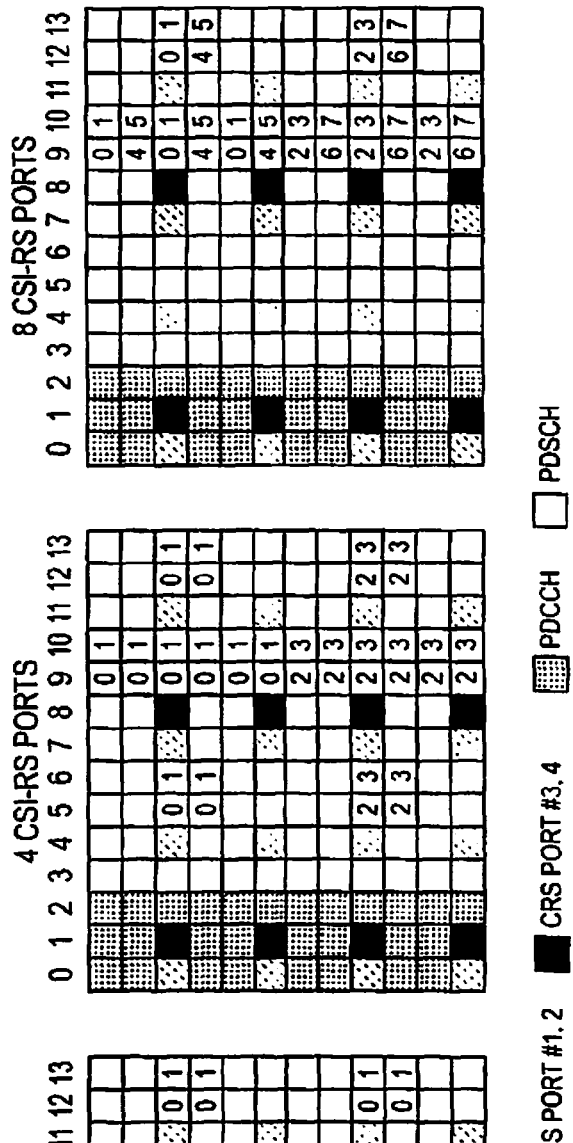
FIG. 5 illustrates the mapping of CSI-RS to an LTE resource grid for two, four, and eight antenna ports.

A detailed illustration of which resource elements within a resource block pair that may potentially be occupied by the new UE-specific reference symbols and CSI-RS is provided in FIG. 5, for the cases in which two, four, and eight transmitter antenna ports are used for the CSI transmission. The CSI-RS utilizes an orthogonal cover code of length two to overlay two antenna ports on two consecutive resource elements. In other words, the CSI-RS are allocated in pairs, where two orthogonal codes of length two are transmitted simultaneously, using the same pair of allocated resource elements, from a pair of antenna ports at the base station.

In FIG. 5, the CSI-RS resource elements are designated with numbers, which correspond to antenna port numbers. In the left-hand diagram, corresponding to the case of two CSI-RS antenna ports, the possible positions for the CSI-RS are labeled "0" and "1", corresponding to antenna ports 0 and 1.

As can be seen in FIG. 5, many different CSI-RS pattern are available. For the case of two CSI-RS antenna ports, for instance, where each CSI-RS pair can be separately configured, there are twenty different patterns within a subframe. When there are four CSI-RS antenna ports, the CSI-RS pairs are assigned two at a time; thus the number of possible patterns is ten. For the case of eight CSI-RS antenna ports, five patterns are available. For TDD mode, some additional CSI-RS patterns are available.

In the following discussion, the term "CSI-RS resource" is used. A CSI-RS resource corresponds to a particular pattern present in a particular subframe. Thus two different patterns in the same subframe constitute two distinct CSI-RSI resources. Likewise, the application of the same CSI-RS pattern to two different subframes again represents two separate instances of a CSI-RS resource, and the two instances are thus again to be considered distinct CSI-RS resources.

Any of the various CSI-RS patterns pictured in FIG. 5 may also correspond to so-called zero-power CSI-RS, which are also referred to as muted REs. A zero-power CSI-RS is a CSI-RS pattern whose resource elements are silent, i.e., there is no transmitted signal on those resource elements. These silent patterns are configured with a resolution corresponding to the four-antenna-port CSI-RS patterns. Hence, the smallest unit of silence that may be configured corresponds to four REs.

The purpose of zero-power CSI-RS is to raise the signal-to-interference-plus-noise ratio (SINR) for CSI-RS in a given cell, by configuring zero-power CSI-RS in interfering cells so that the resource elements that would otherwise cause interference are silent. Thus, a CSI-RS pattern in a given cell is matched with a corresponding zero-power CSI-RS pattern in interfering cells.

Raising the SINR level for CSI-RS measurements is particularly important in applications such as coordinated multi point (CoMP) or in heterogeneous deployments. In CoMP, the UE is likely to need to measure the channel from non-serving cells. Interference from the much stronger serving cell would make those measurements difficult, if not impossible. Zero-power CSI-RS are also needed in heterogeneous deployments, where zero-power CSI-RS in the macro-layer are configured to coincide with CSI-RS transmissions in the pico-layer. This avoids strong interference from macro nodes when UEs measure the channel to a pico-node.

The PDSCH, which carries data targeted for mobile stations, is mapped around the resource elements occupied by CSI-RS and zero-power CSI-RS, so it is important that both the network and the UE are assuming the same CSI-RS and zero power CSI-RS configurations. Otherwise, the UE may be unable to properly decode the PDSCH in subframes that contain CSI-RS or their zero-power counterparts.

The CSI-RS discussed above is used for measurements of the downlink channel, i.e., from a base station to a mobile terminal. In the uplink, so-called sounding reference symbols (SRS) may be used for acquiring CSI about the uplink channel from the UE to a receiving node. When SRS is used, it is transmitted on the last DFT-spread OFDM symbol of a subframe. SRS can be configured for periodic transmission as well for dynamic triggering as part of the uplink grant. The primary use for SRS is to aid the scheduling and link adaptation in the uplink. For time-division duplex (TDD) LTE systems, however, SRS is sometimes used to determine beamforming weights for the downlink, by exploiting the fact that the downlink and uplink channels are the same when the same carrier frequency is used for downlink and uplink (channel reciprocity).

While PUSCH carries data in the uplink, PUCCH is used for control. PUCCH is a narrowband channel using a resource block pair where the two resource blocks are on opposite sides of the potential scheduling bandwidth. PUCCH is used for conveying ACK/NACKs, periodic CSI feedback, and scheduling request to the network.

Before an LTE terminal can communicate with an LTE network it first has to find and acquire synchronization to a cell within the network, a process known as cell search. Next, the UE has to receive and decode system information needed to communicate with and operate properly within the cell. Finally, the UE can access the cell by means of the so-called random-access procedure.

In order to support mobility, a terminal needs to continuously search for, synchronize to, and estimate the reception quality of both its serving cell and neighbor cells. The reception quality of the neighbor cells, in relation to the reception quality of the current cell, is then evaluated in order to determine whether a handover (for terminals in connected mode) or cell re-selection (for terminals in idle mode) should be carried out. For terminals in connected mode, the handover decision is taken by the network, based on measurement reports provided by the terminals. Examples of such reports are reference signal received power (RSRP) and reference signal received quality (RSRQ).

The results of these measurements, which are possibly complemented by a configurable offset, can be used in several ways. The UE can, for example, be connected to the cell with the strongest received power. Alternatively, the UE can be assigned to the cell with the best path gain. An approach somewhere between these alternatives may be used.

These selection strategies do not always result in the same selected cell for any given set of circumstances, since the base station output powers of cells of different type are different. This is sometimes referred to as link imbalance. For example, the output power of a pico base station or a relay node is often on the order of 30 dBm (1 watt) or less, while a macro base station can have an output power of 46 dBm (40 watts). Consequently, even in the proximity of the pico cell, the downlink signal strength from the macro cell can be larger than that of the pico cell. From a downlink perspective, it is often better to select a cell based on downlink received power, whereas from an uplink perspective, it would be better to select a cell based on the path loss.

Figure 6:
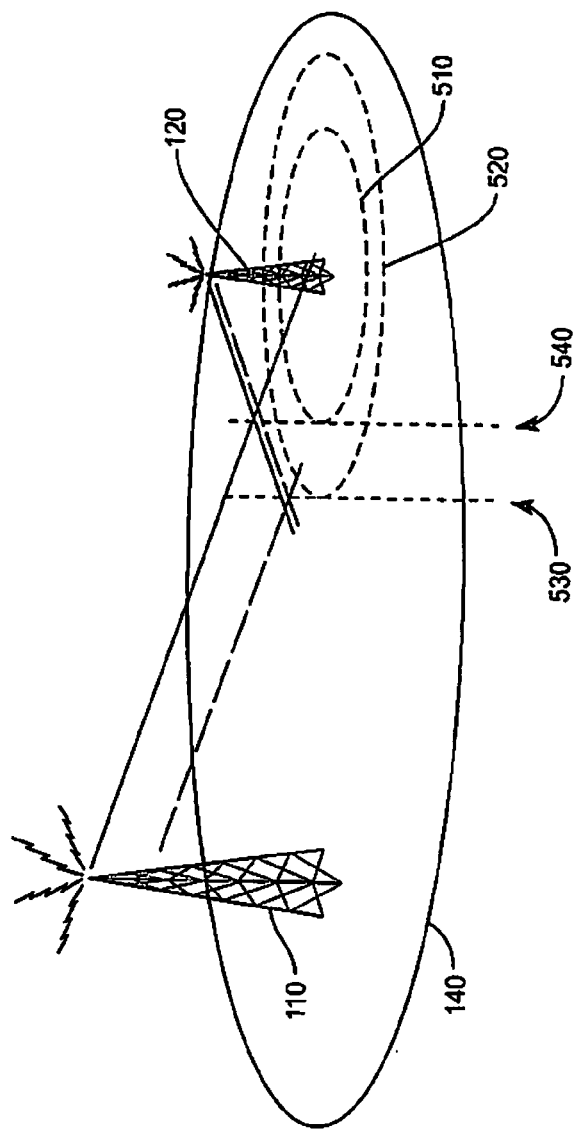
FIG. 6 illustrates the differences between uplink and downlink coverage in a mixed cell scenario.

These alternative cell selection approaches are illustrated in FIG. 6. The solid lines emanating from each of macro-cell 110 and pico-cell 120 represent the received power at each point between the two cells. These lines intersect, i.e., are equal, at border 540. Accordingly, a UE within region 510 will see a stronger received signal from the pico-cell 120, and will get the best downlink performance if it selects pico-cell 120. The dashed lines issuing from pico-cell 120 and macro-cell 110, on the other hand, represent the path loss between a UE at a given point and either the macro-cell 110 or the pico-cell 120. Because the path loss is not weighted by the transmitter output power, these lines intersect at a point halfway between macro-cell 110 and pico-cell 120, as seen at the boundary 530. A UE outside region 520, then, will experience a lower path loss to macro-cell 110 than to pico-cell 120, and will thus achieve better uplink performance if it selects macro-cell 110. Because of this unbalanced situation, there is a region, i.e., the portion of coverage area 520 that is outside coverage area 510, in which neither cell is optimal for both downlink and uplink performance at the same time.

From a system perspective, it might often be better, in the above scenario, for a given UE to connect to the pico-cell 120 even under some circumstances where the downlink from macro-cell 110 is much stronger than the pico cell downlink. However, ICIC across layers will be needed when the terminal operates within the region between the uplink and downlink borders, i.e., the link imbalance zone, as depicted in FIG. 6.

Interference coordination across the cell layers is especially important for the downlink control signaling. If the interference is not handled appropriately, a terminal that is in the region between the downlink and uplink borders in FIG. 6 and is connected to pico-cell 120 may be unable to receive the downlink control signaling from the pico-cell 120.

Figure 7:
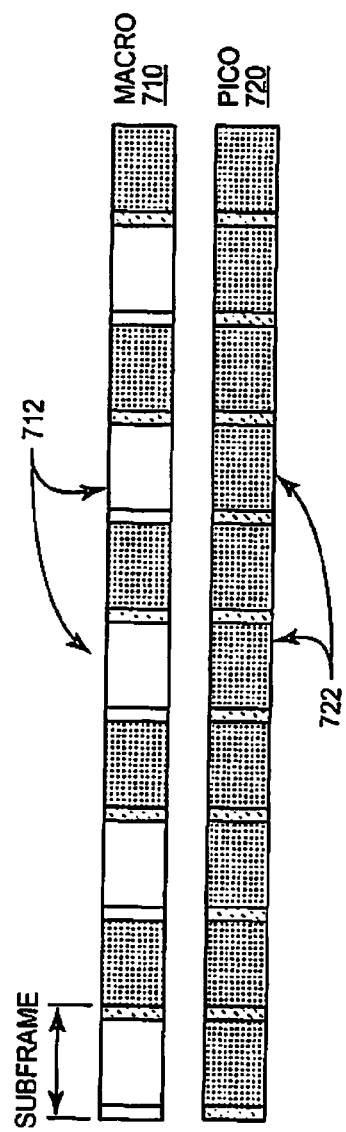
FIG. 7 illustrates the use of inter-cell interference coordination in downlink subframes in a heterogeneous network.

One approach to providing ICIC across layers is illustrated in FIG. 7. An interfering macro-cell, which could create downlink interference towards a pico-cell, transmits a series of subframes 710, but avoids scheduling unicast traffic in certain subframes 712. In other words, neither PDCCHs nor PDSCH are transmitted in those subframes 712. In this way, it is possible to create low-interference subframes, which can be used to protect users of the pico-cell who are operating in the link imbalance zone.

To carry out this approach, the macro-base station (MeNB) indicates to the pico-base station (PeNB), via the backhaul interface X2, which subframes will not be used to schedule users. The PeNB can then take this information into account when scheduling users operating within the link imbalance zone, such that these users are scheduled only in subframes 722 aligned with the low-interference subframes transmitted in the macro layer. In other words, these users are scheduled only in interference-protected subframes. Pico-cell users operating within the downlink border, e.g., within coverage area 510 in FIG. 6, can be scheduled in all subframes, i.e., in both the protected subframes 722 as well as the remaining, un-protected, subframes in the series of subframes 720.

In principle, data transmission (but not control signaling) in different layers could also be separated in the frequency domain by ensuring that scheduling decisions in the two cell layers are non-overlapping in the frequency domain. This could be facilitated by exchanging coordination messages between the different base stations. However, this is not possible for the control signaling, since the control signaling spans the full bandwidth of the signal, according to the LTE specifications, and hence a time-domain approach must be used.

The classical way of deploying a network is for each different transmission/reception point to provide coverage for a cell that is distinct from all others. That is, the signals transmitted from or received at one point are associated with a cell identifier (cell-id) that is different from the cell-id employed for other nearby points. Typically, each of these points transmits its own unique signals for broadcast, e.g., the Physical Broadcast Channel (PBCH), as well as for sync channels, such as the primary synchronization signal (PSS) and secondary synchronization signal (SSS).

The concept of a "point" is heavily used in conjunction with techniques for coordinated multipoint (CoMP). In this context, a point corresponds to a set of antennas covering essentially the same geographical area in a similar manner. Thus, a point might correspond to one of the sectors at a site, but it may also correspond to a site having one or more antennas all intending to cover a similar geographical area. Often, different points represent different sites. Antennas correspond to different points when they are sufficiently geographically separated and/or have antenna diagrams pointing in sufficiently different directions. Techniques for CoMP entail introducing dependencies in the scheduling or transmission/reception among different points, in contrast to conventional cellular systems where a point is operated more or less independently from the other points, from a scheduling point of view.

Figure 8:
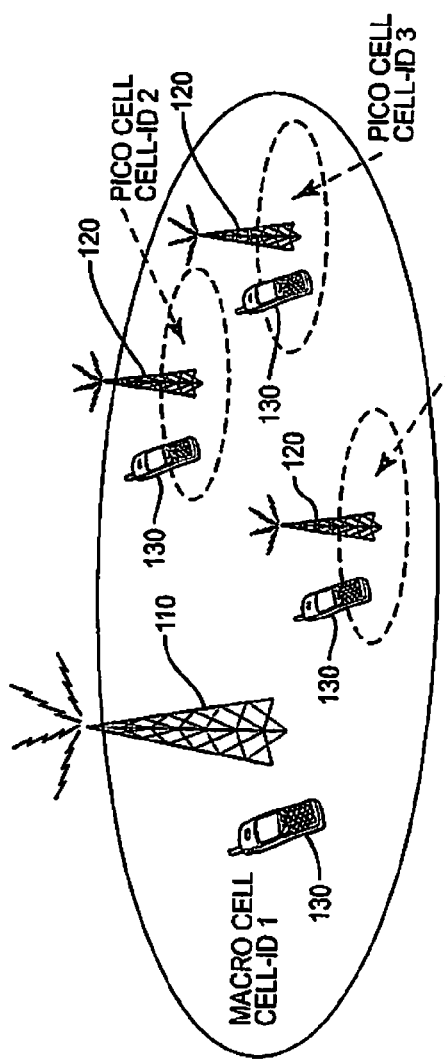
FIG. 8 illustrates a heterogeneous cell deployment where a separate cell-id is used for each point.

The classical strategy of one cell-id per point is depicted in FIG. 8 for a heterogeneous deployment where a number of low-power (pico) points 120 are placed within the coverage area of a higher power macro point 110. In this deployment, the pico-nodes transmit different cell identifiers, i.e., "cell-id 2", "cell-id 3", and "cell-id 4", from the cell identifier "cell-id 1" transmitted by the macro-cell 110. Note that similar principles obviously also apply to classical macro-cellular deployments where all points have similar output power and perhaps are placed in a more regular fashion than what is the case for a heterogeneous deployment.

Figure 9:
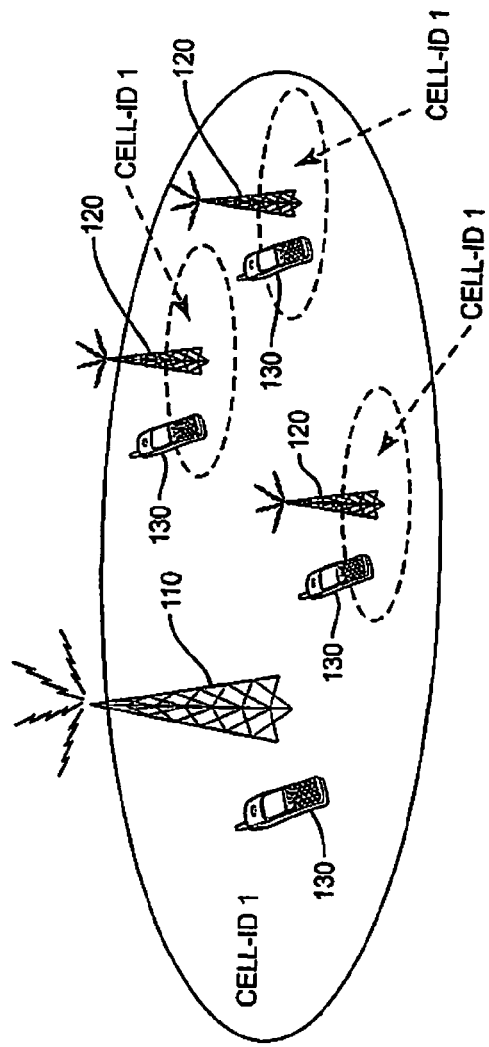
FIG. 9 illustrates a heterogeneous cell deployment where the cell-id is shared between the macro-point and pico-points in the macro-point's coverage area.

An alternative to the classical deployment strategy is to instead let all the UEs within a geographical area outlined by the coverage of the high power macro point be served with signals associated with the same cell-id. In other words, from a UE perspective, the received signals appear as though they come from a single cell. This is illustrated in FIG. 9. Here, all of the pico-nodes 120 transmit the same cell identifier, "cell-id 1", which is also used by the overlaying macro-cell 110.

Note that in both FIGS. 8 and 9 only one macro point is shown; other macro points would typically use different cell-ids (corresponding to different cells) unless they are co-located at the same site (corresponding to other sectors of the macro site). In the latter case of several co-located macro points, the same cell-id may be shared across the co-located macro-points and those pico points that correspond to the union of the coverage areas of the macro points. Sync, BCH and control channels are all transmitted from the high-power point while data can be transmitted to a UE also from low-power points by using shared data transmissions (PDSCH) that rely on UE-specific reference symbols.

Such an approach has benefits for those UEs that are capable of receiving PDSCH based on UE-specific reference symbols, while UEs that only support CRS for PDSCH have to settle for using only the transmission from the high-power point, and thus will not benefit in the downlink from the deployment of extra low-power points. This latter group is likely to include at least all Release 8 and 9 UEs for use in FDD LTE systems.

The single cell-id approach for heterogeneous and/or hierarchical cell deployments is geared towards situations in which there is fast backhaul communication between the points associated with the same cell identifier. A typical case would be a base station serving one or more sectors on a macro level as well as having fast fiber connections to remote radio units (RRUs) performing the role of the other points that share the same cell-id. Those RRUs could represent low-power points with one or more antennas each. Another example is when all the points have a similar power class, with no single point having more significance than the others. The base station would then handle the signals from all RRUs in a similar manner.

A clear advantage of the shared cell-id approach compared with the classical one is that the handover procedure between cells only needs to be invoked on a macro basis. Another important advantage is that interference from CRS can be greatly reduced, since CRS does not have to be transmitted from every point. There is also much greater flexibility in coordination and scheduling among the points, which means the network can avoid relying on the inflexible concept of semi-statically configured low-interference subframes, as illustrated in FIG. 7. A shared-cell approach also allows decoupling of the downlink from the uplink, so that, for example, path-loss-based reception-point selection can be performed for the uplink, without creating a severe interference problem for the downlink, where the UE may be served by a transmission point different from the point used in the uplink receptions.

One problem with existing solutions for shared-cell-id deployments is the handling of UEs that do not support UE-specific reference symbols. Those UEs use CRS, and do not directly benefit, from a downlink perspective, from the deployment of extra low-power points in a heterogeneous deployment. Another potential problem is that the coverage of synch channels may also be limited, for all UEs.

Accordingly, in several embodiments of the present invention, the same cell-common signals transmitted from the high-power (macro) point in a heterogeneous deployment, such as CRS and synch channels, are also distributed over at least some of the low-power (pico) points associated with the same cell. In some embodiments, the set of low-power points involved in this distribution may be adapted by the network, based on channel properties of the UEs served by the cell. Similarly, the points participating in CRS-based transmissions of the data of PDSCH and/or PDCCH for a particular UE may be the same or different from the set of points used for the CRS distribution, depending on traffic pattern, UE capabilities, and the properties of the channels for the UE of interest.

Note that this high-level sketch of example features of some embodiments of the invention does not include the distribution of synch channel and how that may be different from how CRS is transmitted. Those skilled in the art will appreciate that similar approaches may be taken for the synch channel, but also that these approaches may be adapted to account for the different ways in which the synch channel is transmitted and used.

More particularly, in some embodiments, a high-power point and one or more low-power points transmit signals associated to the same cell-id, in a heterogeneous deployment. The coverage areas corresponding to the low-power points fall at least partly within the coverage area for the high-power point, so that mobile stations within range of a low-power point are also within range of the high-power point (from a downlink perspective).

The same CRS signals are transmitted by both the high-power (macro) point and some or all of the low-power (pico) points. At the same time, the network transmits CRS-based PDSCH for a particular UE on both the high-power point as well as on some or all of the low-power points. In some embodiments, and/or under some circumstances, all of the low-power points participate in the CRS-based PDSCH transmission to a particular UE, while in other embodiments, and/or under some circumstances, only a subset of the points, e.g., those points that the UE hears sufficiently well, participate in the PDSCH transmission using CRS for channel estimation.

In some embodiments, the network monitors the traffic load of the different points and the channel properties from the points to the various UEs. Based on this monitoring, the network can selectively power down CRS transmission for points that do not handle a sufficiently large amount of traffic. It may be advantageous in some embodiments to make this power down/up of CRS smooth (i.e., gradual), such that the changes in CRS power have a similar rate of time-variations as the time-variations induced by the channel fading. This approach can help avoid ruining the channel interpolation mechanism on the UE side.

To improve the performance for all UEs when adding low-power points to a high-power point in a heterogeneous shared cell-id scenario, the same CRS can be transmitted from both the high-power as well as low-power points, to achieve combining gains at the receiving UEs. The same applies to PDSCH transmissions for which the UEs rely on CRS for demodulation; these transmissions are referred to herein as "CRS-based" PDSCH transmissions. Thus, at least some of the low-power points sharing the same cell-id also participate in the CRS-based PDSCH transmission to a given UE that uses CRS for PDSCH. In one example, all points associated with the same cell-id transmit CRS and PDSCH based on CRS. CRS are also used for PBCH, PDCCH, PHICH, and PCFICH, so these channels can also be distributed over a mixture of high- and low-power points.

The sync channels PSS and SSS represent antenna ports of their own and may be transmitted in a different manner than the CRS. Nevertheless, in some embodiments PSS and SSS also are transmitted from all the points operated by the same base station.

Distributing the signals in this manner helps UEs that do not support UE-specific reference symbols to benefit (in the downlink) from the additional low-power points, by raising their SINR levels when they are in the vicinity of a low-power point. At the same time, UEs that do support UE-specific reference symbols can continue enjoying extra capacity gains, since the same time-frequency transmission resources can be used by different points, for downlink transmissions to different UEs, as long as they are sufficiently isolated from each other.

An alternative to letting CRS-based PDSCH be transmitted from all points is to only use a subset of the points for such a transmission, even if the CRS is transmitted from all or another subset of points. In other words, CRS and CRS-based PDSCH need not be transmitted from precisely the same set of low-power points. To do this, it is advantageous if PDSCH is transmitted from at least all the points the UE hears sufficiently well. Otherwise, channel estimates based on CRS would no longer adequately reflect the channel that the data is conveyed over. For example, if the UE is close to one of the low-power points, data as part of PDSCH might only be transmitted from that point, while the UE would still estimate the channel based on CRS coming from all points.

Points that serve no UEs or that are not crucial in serving any (CRS-dependent) UEs could be powered down, either completely or in part, for example by turning off the CRS transmission. When doing this, it may be beneficial in some systems or in some circumstances to power down the CRS in a smooth non-abrupt fashion, so as to not distort the channel estimates in the UE, which typically uses interpolation in time to form channel estimates. Based on the traffic load and the properties of the channels from the points to the UEs, the network can select the points in which to power down CRS and associated signals. As previously mentioned, some UEs only support reception of CRS-based transmissions, so capabilities of the served UEs may be another factor to take into account when deciding on what points to power down. Usually, the CRS transmissions from the high-power (macro) point would not be powered down, since these transmissions offer a kind of baseline coverage within the macro coverage area. However, circumstances in which CRS transmissions from the macro point may be powered down or off are conceivable, such as when all the UEs in the macro cell are best served directly by low-power points.

Channel properties used in deciding what points to power down may be acquired from measurements of signals in the uplink. For instance, measurements on SRS, PUCCH, or PUSCH may give an indication of the path loss between a point and a UE. CSI feedback from the UE may also be used. Naturally, there is a corresponding power-up procedure working in a similar manner to the above-described power-down procedure; this power-up procedure may also be based on measurements of uplink signals and/or UE CSI feedback.

A similar power-down/up mechanism can be applied to other transmission signals including the synchronization signals PSS and SSS. Smoothness in power-down/up may be achieved by gradually increasing the rate at which the power is reduced or increased, followed by gradually decreasing the rate of change as the power approaches the intended new level. The rate at which the power changes may depend on the rate of time-variations induced by the channel fading, so as to not upset possible time-domain interpolation algorithms in the UEs.

Embodiments of the above-described techniques include methods performed at one or more nodes in a network (e.g, at an LTE eNodeB) for configuring the transmission of CRS and/or one or more other cell-common signals, such as synch signals. In several embodiments, a subset of low-power points associated with a given cell are selected and configured to transmit the same CRS as the high-power point in the cell; in some embodiments, the same subset or a different subset are selected and configured to transmit one or more cell-common synch signals. A CRS-based physical downlink shared channel (PDSCH) is simultaneously transmitted from the high-power cell and at least one of the low-power points that are transmitting the CRS.

In some embodiments, these selections are based on one or more of channel conditions between low-power points and one or more UEs; these selections may also be based on UE capabilities (e.g., lack of support for UE-specific reference symbols) and/or UE CSI feedback. One or more of these methods may be based on measurement data received from the mobile terminals, including CSI feedback, and may alternatively and/or also depend on identification by the mobile terminals of well-heard transmission points.

Figure 10:
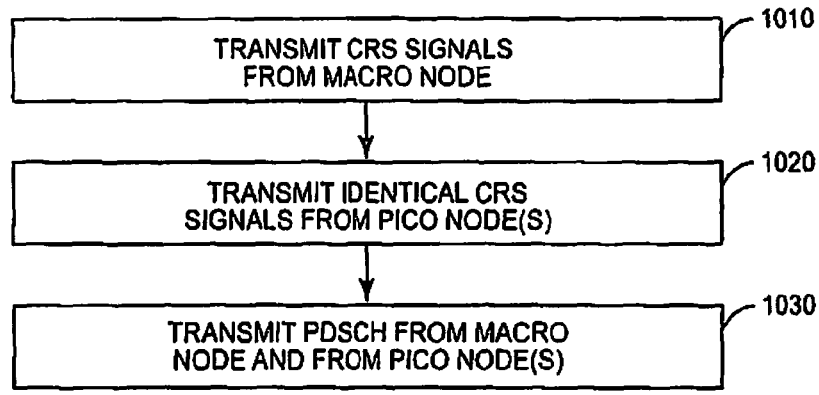
FIG. 10 is a process flow diagram illustrating a method for transmitting data to a mobile station in a heterogeneous cell deployment.

FIG. 10 illustrates a process flow diagram according to several embodiments of the present invention, such as might be implemented in a network that includes a primary transmitting node, having a first coverage area, and one or more secondary transmitting nodes, each having a corresponding coverage area that falls within the first coverage area. The illustrated process includes, as shown at block 1010, the transmission of CRS signals from the primary, or "macro" node. The technique also includes the transmission of the same CRS signals from the secondary, or "pico" nodes, as shown at block 1020. Finally, as shown at block 1030, the illustrated process also includes the transmission of a physical downlink shared channel from the primary transmitting node as well as from at least one of the secondary transmitting nodes.

In some cases, of course, there may be more than one secondary transmitting node in the first coverage area. In some cases, the same CRS signals are transmitted from all of the two or more secondary transmitting nodes. In some of these cases, the CRS-based physical downlink shared channel is also transmitted from all of the two or more secondary transmitting nodes, while in others it is transmitted from only a subset of the secondary nodes.

Figure 11:
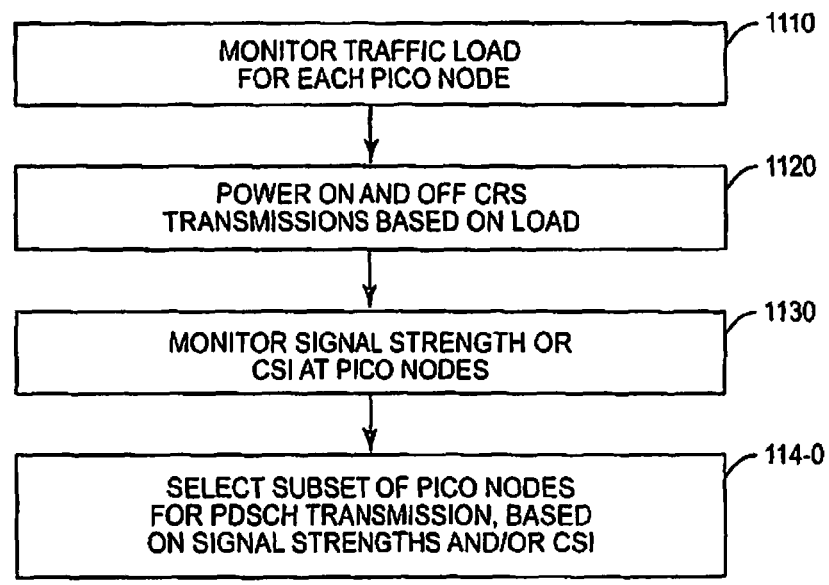
FIG. 11 is a process flow diagram illustrating a method for managing pico-nodes in a heterogeneous cell deployment.

In some cases where there are two or more secondary transmitting nodes in the first coverage area, traffic load at each of the secondary transmitting nodes is monitored and transmissions of the CRS signal at each secondary transmitting node are selectively powered on and/or off, based on the corresponding traffic load. This is done, in some instances, by measuring uplink signals from a plurality of mobile stations in the first coverage area. This is shown in FIG. 11, at blocks 1110 and 1120, respectively. In some cases, the power levels of the transmissions are ramped up and/or ramped down, as appropriate, over a time interval that is selected so that the change in CRS power level is slower than channel variations due to fading.

In some embodiments of the process illustrated in FIG. 11, the particular subset of secondary nodes used for transmitting the physical shared downlink channel is determined based on whether PDSCH transmissions from each secondary transmitting node could be received by the mobile station with adequate signal strength. This is done, in some instances, by measuring uplink transmissions from the mobile station at one or more of the secondary transmitting nodes, or by monitoring channel-state-information feedback from the mobile station, or both. This process is illustrated at blocks 1130 and 1140 of FIG. 11.

Other embodiments of the inventive techniques disclosed herein include a wireless system, including a primary node and one or more secondary nodes, corresponding to the methods and techniques described above. In some cases, the methods/techniques described above will be implemented in a system of transmitting nodes such as the one pictured in detail in FIG. 12.

Figure 12:
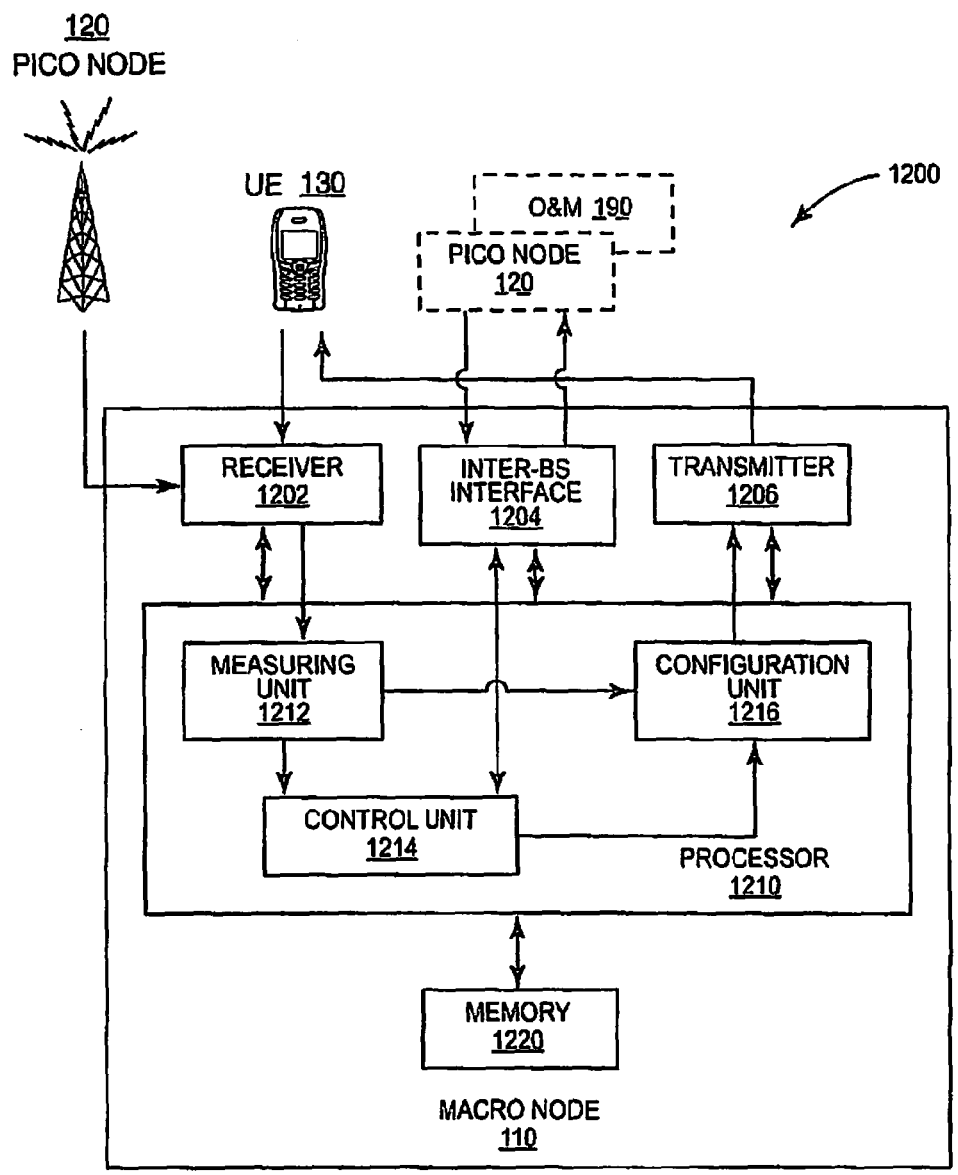
FIG. 12 is a block diagram illustrating features of nodes in a heterogeneous cell deployment.

The system pictured in FIG. 12 includes a macro node 110, two pico nodes 120, a UE 130, and an O&M node 190. The macro node 110 is configured to communicate with pico nodes 120 and O&M node 190 via inter-base-station interface 1204, which comprises suitable network interface hardware controlled by software carrying out network interfacing protocols. Macro node 110 includes a receiver 1202 and transmitter 1206 for communicating with UE 130; in some cases receiver 1202 may also be configured to monitor and/or measure signals transmitted by pico node 120. Receiver circuit 1202 and transmitter circuit 1206 use known radio processing and signal processing components and techniques, typically according to a particular telecommunications standard such as the 3GPP standard for LTE-Advanced. Because the various details and engineering tradeoffs associated with the design of interface circuitry and radio transceiver circuits are well known and are unnecessary to a full understanding of the invention, additional details are not shown here.

Macro node 110 further includes a processing circuit 1210, which includes one or more microprocessors or microcontrollers, as well as other digital hardware, which may include digital signal processors (DSPs), special-purpose digital logic, and the like. Either or both of the microprocessor(s) and the digital hardware may be configured to execute program code stored in memory 1220, along with stored radio parameters. Again, because the various details and engineering tradeoffs associated with the design of baseband processing circuitry for mobile devices and wireless base stations are well known and are unnecessary to a full understanding of the invention, additional details are not shown here. However, several functional aspects of the processing circuit 1210 are shown, including a measuring unit 1212, a control unit 1214, and a configuration unit 1216. Configuration unit 1216 controls radio transmitter 1206 to transmit CRS and PDSCH, under the control of control unit 1214, which also manages the communications with other nodes via inter-BS interface circuit 1204. Control unit 1214 also evaluates data obtained from measuring unit 1212, such as channel state information and/or load information, and controls inter-base-station communication and transmitter configuration accordingly.

Program code stored in memory circuit 1220, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described herein, in several embodiments. Radio parameters stored in memory 1220 may include one or more pre-determined tables or other data for supporting these techniques, in some embodiments.

Pico nodes 120 may comprise components and functional blocks very similar to those illustrated in macro node 110, with the corresponding control units being responsible for receiving control instructions from a macro node 110 (or other pico node 120) and configuring the pico node's transmitter circuits accordingly.

Implementations of the inventive techniques described herein allow even UEs that only support CRS-based demodulation to benefit from increased performance in the downlink when low-power transmission points are deployed. Combining of the signals from several transmission nodes occur in the air, resulting in increased SINR levels.

CRS may be transmitted from a multitude of transmission points without creating severe interference problems for UEs that are served by a low-power point while also receiving a stronger signal from a high power point. Similar benefits are present for the synch channels. Further reduction of interference as well as energy savings are possible by employing the described power-down/up procedures while making sure that channel interpolation in the UEs does not ruin the channel estimate and thus the demodulation performance.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention. The present embodiments are thus to be considered in all respects as illustrative and not restrictive.

What is claimed is:

1. A method for transmitting data to a mobile station, the method comprising
    transmitting cell-specific reference symbol (CRS) signals from a primary, high-power, transmitting node having a first coverage area;
    transmitting the same CRS signals from each of two or more secondary, low-power, transmitting nodes, each of the secondary transmitting nodes having a coverage area that is within or substantially within the first coverage area;
    simultaneously transmitting a physical downlink data channel to a mobile station from the primary, high-power, transmitting node and from at least one of but fewer than all of the two or more secondary, low-power, transmitting nodes, wherein said at least one but fewer than all of the two or more secondary, low-power, transmitting nodes is selected based on a determination of whether the physical downlink data channel transmissions from each secondary transmitting node could be received by the mobile station with adequate signal strength; and monitoring traffic load at each of said secondary transmitting nodes; and selectively powering on and powering off transmissions of the CRS signals at each secondary transmitting node, based on the corresponding traffic load.

2. The method of claim 1, wherein said determination is made by measuring uplink transmissions from the mobile station at one or more of the secondary transmitting nodes, or by monitoring channel-state-information feedback from the mobile station, or both.

3. The method of claim 1, wherein the CRS signals comprises a series of CRS symbol transmissions, and wherein selectively powering on and powering off transmissions of the CRS signals at each secondary transmitting node comprises ramping up and ramping down, respectively, the power level of CRS signal transmissions over a plurality of CRS symbol transmissions.

4. The method of claim 1, further comprising transmitting a same synchronization channel from all of said secondary transmitting nodes.

5. A system of transmitting nodes in a wireless network, the system comprising:
 a primary, high-power, transmitting node configured to transmit cell-specific reference symbol (CRS) signals over a first coverage area, and;
 two or more secondary, low-power, transmitting nodes, each configured to transmit the same CRS signals over a coverage area that is within or substantially within the first coverage area;
 wherein said primary transmitting node and at least one of but fewer than all of said two or more secondary transmitting nodes are configured to simultaneously transmit a physical downlink data channel to a first mobile station;
 wherein the system further comprises a control element configured to select said at least one but fewer than all of the two or more secondary transmitting nodes for transmitting the physical downlink data channel to the mobile station, based on whether physical downlink data channel transmissions from each secondary transmitting node could be received by the mobile station with adequate signal strength, to monitor traffic load at each of the secondary transmitting nodes, and to selectively cause each secondary transmitting node to power on and power off transmissions of the CRS signals, based on the corresponding traffic load.

6. The system of claim 5, wherein the control element is configured to select said at least one but fewer than all of the two or more secondary transmitting nodes based on measurements of uplink transmissions from the mobile station at one or more of the secondary transmitting nodes, or based on monitoring of channel-state-information feedback from the mobile station, or both.

7. The system of claim 5, wherein each of the secondary transmitting nodes is configured to power on and power off transmissions of the CRS signal by ramping up and ramping down, respectively, the power level of CRS signal transmissions over a time interval selected so that the change in CRS power level is slower than channel variations due to fading.

8. The system of claim 5, wherein all of said two or more secondary transmitting nodes are configured to transmit a same synchronization signal.

9. A control unit for use in a wireless network having a primary, high-power, transmitting node with a first coverage area and a plurality of secondary, low-power, transmitting nodes, each having a coverage area that is within or substantially within the first coverage area, the control unit comprising:
 a network communication circuit configured to transmit and receive control information to and from said secondary transmitting nodes; and
 a processing circuit configured to configure said primary transmitting node to transmit cell-specific reference symbol (CRS) signals over the first coverage area;
 wherein the processing circuit is further configured to:
 configure two or more of said secondary transmitting nodes to transmit the same CRS signals;
 configure said primary transmitting node and at least one of but fewer than all of said two or more secondary transmitting nodes to simultaneously transmit a physical downlink data channel to a mobile station, wherein the processing circuit is further configured to select said at least one but fewer than all of said two or more secondary transmitting nodes based on a determination of whether physical downlink data channel transmissions from each secondary transmitting node could be received by the mobile station with adequate signal strength;
 monitor traffic load at each of the secondary transmitting nodes; and
 selectively configure each of the secondary transmitting nodes to power on and power off transmissions of the CRS signals, based on the corresponding traffic load.

10. The control unit of claim 9, wherein the processing circuit is configured to configure all of said secondary transmitting nodes in the first coverage area to transmit the same CRS signals.

11. The control unit of claim 9, wherein the processing circuit is configured to select said at least one but fewer than all of said two or more secondary transmitting nodes based on measurements of uplink transmissions from the mobile station at one or more of the secondary transmitting nodes, or based on monitoring channel-state-information feedback from the mobile station, or both.

12. The control unit of claim 9, wherein the control unit is part of the primary transmitting node.

13. The control unit of claim 9, wherein the control unit is part of one of the secondary transmitting nodes, and wherein the network communication circuit is further configured to transmit and receive control information to and from the primary transmitting node.

* * * * *